United States Patent [19]
Bode et al.

[11] Patent Number: 5,795,658
[45] Date of Patent: Aug. 18, 1998

[54] HONEYCOMB BODY HAVING MICROSTRUCTURES IN AN INTERSECTING CONFIGURATION

[75] Inventors: Hans Bode, Remscheid; Udo Martin, Wuppertal, both of Germany

[73] Assignee: Emitec Gesellschaft fuer Emissionstechnologie mbH, Lohmar, Germany

[21] Appl. No.: 824,441

[22] Filed: Mar. 26, 1997

Related U.S. Application Data

[63] Continuation of PCT/EP95/03759 Sep. 22, 1995.

[30] Foreign Application Priority Data

Sep. 26, 1994 [DE] Germany .................. 44 34 363.9
Oct. 7, 1994 [DE] Germany .................. 44 35 913.6

[51] Int. Cl.[6] ................ B32B 3/28; F01N 3/28; B01J 35/04
[52] U.S. Cl. .................. 428/593; 428/603; 428/604; 502/527
[58] Field of Search .............. 428/593, 603, 428/604; 502/439, 527; 422/180

[56] References Cited

U.S. PATENT DOCUMENTS

| | | | |
|---|---|---|---|
| 1,987,798 | 1/1935 | Ruppricht | 428/603 |
| 3,254,968 | 6/1966 | Bender | 428/603 |
| 3,716,344 | 2/1973 | Ashburn | 422/180 |
| 3,956,543 | 5/1976 | Stangeland | 428/604 |
| 4,098,722 | 7/1978 | Cairns | 252/466 J |
| 4,152,302 | 5/1979 | Nonnenmann et al. | 428/593 |
| 4,273,681 | 6/1981 | Nonnenmann | 428/603 |
| 4,576,800 | 3/1986 | Retallick | 428/603 |
| 4,847,966 | 7/1989 | Kuchelmeister | 502/439 |
| 5,045,403 | 9/1991 | Maus et al. | 428/593 |
| 5,118,477 | 6/1992 | Takikawa et al. | 422/180 |
| 5,126,183 | 6/1992 | Smith | 428/593 |
| 5,157,010 | 10/1992 | Maus et al. | 428/593 |
| 5,413,872 | 5/1995 | Faigle | 428/603 |
| 5,658,536 | 8/1997 | Okabe et al. | 502/527 |

*Primary Examiner*—John J. Zimmerman
*Attorney, Agent, or Firm*—Herbert L. Lerner; Laurence A. Greenberg

[57] ABSTRACT

A metal honeycomb body includes sheet metal layers. At least some of the layers have at least one macrostructure forming a multiplicity of channels for conducting a fluid in a flow direction and determining a honeycomb shape. At least some of the layers have microstructures at least in some regions. The microstructures extend at an angle to the flow direction, succeed one another at intervals and intersect one another.

10 Claims, 2 Drawing Sheets

5,795,658

1

HONEYCOMB BODY HAVING MICROSTRUCTURES IN AN INTERSECTING CONFIGURATION

CROSS-REFERENCE TO RELATED APPLICATION

This application is a Continuation of International Application Serial No. PCT/EP95/03759, filed Sep. 22, 1995.

BACKGROUND OF THE INVENTION

Field of the Invention

The invention relates to a metal honeycomb body with a multiplicity of channels through which a fluid can flow in a flow direction, including sheet metal layers, at least some of the layers have at least one first macrostructure that forms the channels and determines the honeycomb shape, at least some of the layers have additional microstructures at least in some regions, and the microstructures extend at an angle to the flow direction and succeed one another at intervals.

One such metal honeycomb body is known from Published European Patent Application 0 454 712 B1, corresponding to U.S. Pat. No. 5,157,010.

A honeycomb body constructed in accordance with Published European Patent Application 0 454 712 B1, corresponding to U.S. Pat. No. 5,157,010, is generally satisfactory in function.

However, in view of the fact that the metal honeycomb body is provided with a catalytically active surface which contains noble metals, the goal is to reduce the proportion of noble metal as much as possible, which makes it possible to lower the production costs for a catalytic converter.

SUMMARY OF THE INVENTION

It is accordingly an object of the invention to provide a honeycomb body having microstructures in an intersecting configuration, which overcomes the hereinafore-mentioned disadvantages of the heretofore-known devices of this general type in such a way that the catalytic effectiveness of the honeycomb body is increased.

With the foregoing and other objects in view there is provided, in accordance with the invention, a metal honeycomb body, comprising sheet metal layers; at least some of the layers having at least one first macrostructure forming a multiplicity of channels for conducting a fluid in a flow direction and determining a honeycomb shape; and at least some of the layers having additional microstructures at least in some regions, the microstructures extending at an angle to the flow direction, succeeding one another at intervals and intersecting one another.

In accordance with another feature of the invention, the layers are alternating smooth and corrugated layers, and the corrugated layers have the microstructures.

In accordance with a further feature of the invention, the corrugated layers have crests, and the microstructures intersect at the crests.

In accordance with an added feature of the invention, the corrugated layers have troughs, and the microstructures intersect at the troughs.

In accordance with an additional feature of the invention, the corrugated layers have sides, and the microstructures intersect on at least one of the sides.

In accordance with yet another feature of the invention, the corrugated layers have crests and t roughs, and the microstructures intersect at the crests and troughs.

2

In accordance with yet a further feature of the invention, the corrugated layers have crests and sides, and the microstructures intersect on the crests and on at least one of the sides.

In accordance with yet an added feature of the invention, the corrugated layers have troughs and sides, and the microstructures intersect in the troughs and on at least one of the sides.

In accordance with yet an additional feature of the invention, the corrugated layers have crests, troughs and sides, and the microstructures intersect at the crests, at the troughs and on at least one of the sides.

In accordance with a concomitant feature of the invention, the layers are alternating smooth and corrugated layers, and the smooth layers have the microstructures.

Surprisingly, it has been demonstrated that as a result of the intersection of the microstructures, an additional fluidic effect ensues. The fluidic effect is expressed in the fact that the intersecting microstructures reinforce the mixing of the peripheral and core flows. As a result, a better mass transfer takes place between the gas and the catalytically active surface of individual flow channels. Thus the removal of the products and the transport of the educts to the catalytically effective surface is improved, since the flow then itself has a component that is aimed toward the surface, and therefore that flow component reinforces the transport to the catalytically active surface.

It has been demonstrated that the flow effect is dependent on the location of the intersections.

A major reinforcement of the mixing occurs depending on where the intersections are located. If the microstructures intersect at the crests at the corrugations, the result is a more strongly intertwined flow behavior.

The flow behavior can also be influenced if the angle at which the microstructures intersect is relatively small. The flow cannot become calm between two microstructures, and therefore intensive mixing within the flow takes place.

In honeycomb bodies that are wound up from corrugated and smooth sheet metal layers according to the invention, the smooth layers likewise have a microstructure, which extends longitudinally of the layers. An embodiment of a microstructure that extends crosswise to the longitudinal direction of the layers has until now not been achieved in production, since the forces required to wind up such a smooth layer necessitate the use of tools that have to bring major forces to bear in order to achieve winding of the layers. Moreover, crumpling of the layers was found to occur.

As a result of the proposal that intersecting structures be formed on smooth layers, it is now possible for the smooth layer to be wound without increased effort, and as a result the mixing is improved. Moreover, increased stability of the honeycomb body is attained. The cross-sectional shapes of the microstructures may, for example, correspond to those described in Published European Patent Application 0 454 712 B1, corresponding to U.S. Pat. No. 5,157,010.

Other features which are considered as characteristic for the invention are set forth in the appended claims.

Although the invention is illustrated and described herein as embodied in a honeycomb body having microstructures in an intersecting configuration, it is nevertheless not intended to be limited to the details shown, since various modifications and structural changes may be made therein without departing from the spirit of the invention and within the scope and range of equivalents of the claims.

DESCRIPTION OF THE PREFERRED EMBODIMENTS

Figure 1:
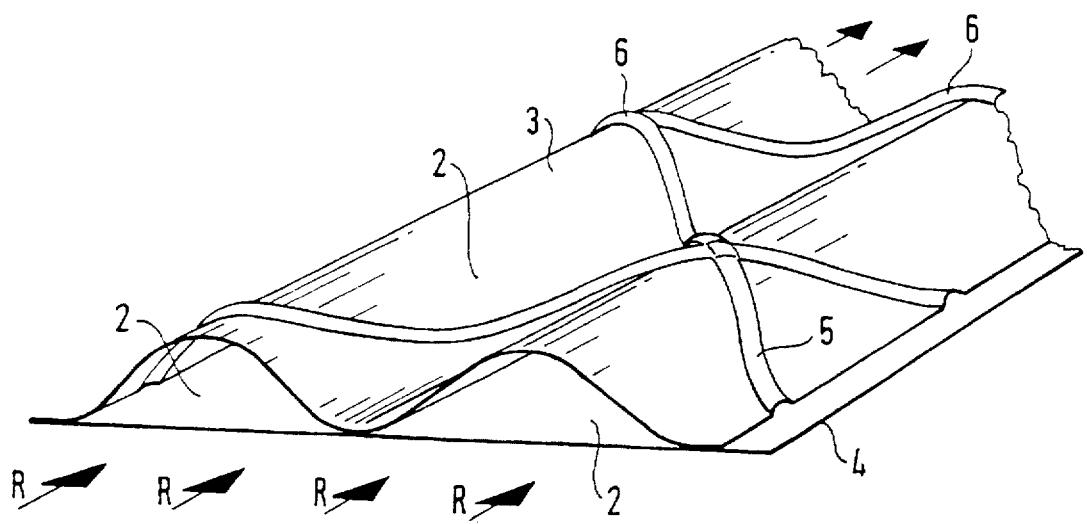
FIG. 1 is a fragmentary, diagrammatic, perspective view of a first embodiment of a corrugated sheet metal layer with a microstructure.

Referring now to the figures of the drawings in detail and first, particularly, to FIG. 1 thereof, there is seen a metal frame body that includes a multiplicity of channels 2 which are formed by sheet metal layers 3, 4 and through which fluid F can flow in a flow direction R. The layers 3 are constructed in corrugated form. The layers 4 are smooth. The corrugated layers and the smooth layers are disposed alternatingly with one another.

The corrugated layers 3 are provided with a microstructure 5. The microstructure 5 involves intersecting striplike embossed features in the corrugated sheet metal layer 3. As can be seen from FIG. 1, the microstructures 5 intersect at corrugation peaks or crests 6.

Figure 2:
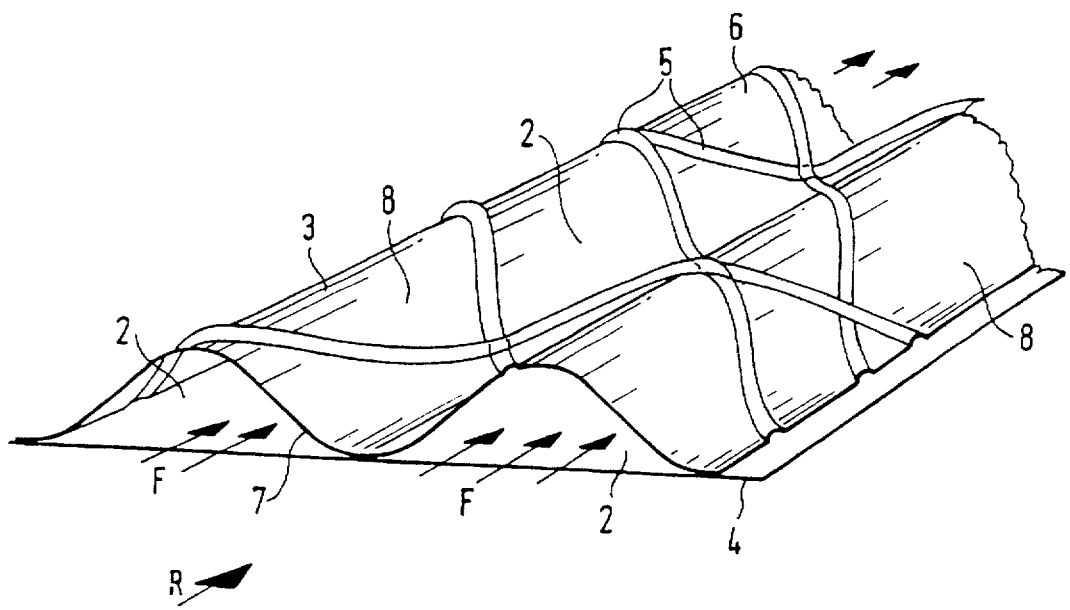
FIG. 2 is a view similar to FIG. 1 of a second embodiment of a corrugated sheet metal layer with a microstructure.

FIG. 2 shows a further embodiment. It differs from the embodiment shown in FIG. 1 in that the microstructures 5 intersect not only on the crests 6 but rather also in corrugation troughs 7 and at flanks or sides 8.

The intersecting corrugation structures are formed at an angle to the flow direction.

Figure 3:
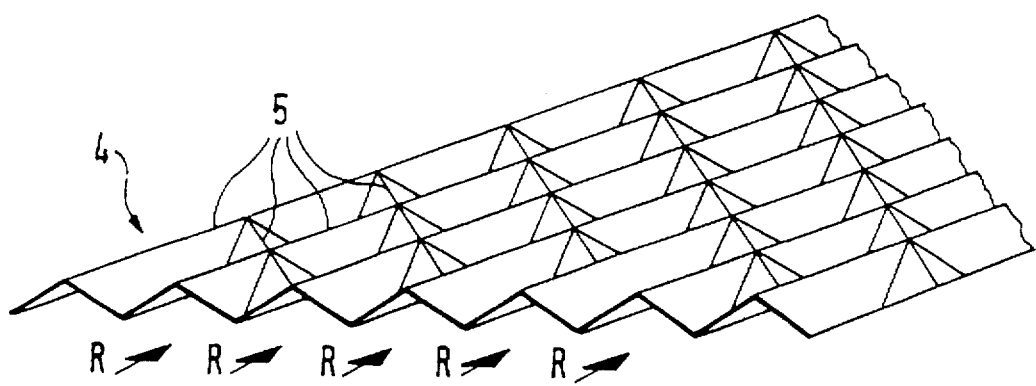
FIG. 3 is a fragmentary, perspective view of a smooth sheet metal layer with a microstructure.

FIG. 3 shows a smooth layer 4. The smooth layer 4 has intersecting microstructures 5.

The intersecting microstructures of the smooth layer make it possible to wind up a hot or warm body, which was previously possible only with structures that extended in the winding direction.

It is also possible to form a hot or warm body by combining a corrugated layer that has a microstructure with a smooth layer that has a microstructure.

We claim:

1. A metal honeycomb body, comprising:
   sheet metal layers;
   at least some of said layers having at least one macrostructure forming a multiplicity of channels for conducting a fluid in a flow direction and determining a honeycomb shape; and
   at least some of said layers having microstructures at least in some regions, said microstructures extending at an angle to the flow direction, succeeding one another at intervals and intersecting one another.

2. The honeycomb body according to claim 1, wherein said layers are alternating smooth and corrugated layers, and said corrugated layers have said microstructures.

3. The honeycomb body according to claim 2, wherein said corrugated layers have crests, and said microstructures intersect at said crests.

4. The honeycomb body according to claim 2, wherein said corrugated layers have troughs, and said microstructures intersect at said troughs.

5. The honeycomb body according to claim 2, wherein said corrugated layers have sides, and said microstructures intersect on at least one of said sides.

6. The honeycomb body according to claim 2, wherein said corrugated layers have crests and troughs, and said microstructures intersect at said crests and troughs.

7. The honeycomb body according to claim 2, wherein said corrugated layers have crests and sides, and said microstructures intersect on said crests and on at least one of said sides.

8. The honeycomb body according to claim 2, wherein said corrugated layers have troughs and sides, and said microstructures intersect in said troughs and on at least one of said sides.

9. The honeycomb body according to claim 2, wherein said corrugated layers have crests, troughs and sides, and said microstructures intersect at said crests, at said troughs and on at least one of said sides.

10. The honeycomb body according to claim 1, wherein said layers are alternating smooth and corrugated layers, and said smooth layers have said microstructures.

* * * * *